United States Patent
Xu et al.

(10) Patent No.: US 10,069,369 B2
(45) Date of Patent: Sep. 4, 2018

(54) VIBRATING MOTOR

(71) Applicants: Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 274 days.

(21) Appl. No.: 15/080,327

(22) Filed: Mar. 24, 2016

(65) Prior Publication Data

US 2017/0025937 A1    Jan. 26, 2017

(30) Foreign Application Priority Data

Jul. 24, 2015   (CN) ..................... 2015 2 0545768 U

(51) Int. Cl.
   *H02K 33/00*   (2006.01)
   *H02K 5/10*    (2006.01)
   *H02K 33/18*   (2006.01)

(52) U.S. Cl.
   CPC ............... *H02K 5/10* (2013.01); *H02K 33/18* (2013.01)

(58) Field of Classification Search
   CPC .............................. H02K 35/02; H02K 15/00
   USPC ................................ 310/15, 25, 36; 29/596
   See application file for complete search history.

(56) References Cited

U.S. PATENT DOCUMENTS

2013/0169072 A1* 7/2013 Oh .......................... B06B 1/045
                                                               310/36

\* cited by examiner

*Primary Examiner* — Hanh Nguyen
(74) *Attorney, Agent, or Firm* — Na Xu; IPro, PLLC

(57) ABSTRACT

A vibrating motor is provided in the present disclosure. The vibrating motor includes a shell, a magnetic assembly received in the shell, a pair of elastic members suspending the vibrating unit, and a coil assembly for driving the magnetic assembly to vibrate. The shell includes a main plate and a cover covering the main plate; the cover includes a bottom plate opposite to the main plate; the bottom plate includes a pair of first opening portions, and the main plate comprises a pair of second opening portions, the first opening portions and the second opening portions are arranged corresponding to each other for assembling the magnetic assembly; the magnetic assembly includes a pair of positioning grooves, the positioning grooves are aligned with the first opening portions and the second opening portions.

14 Claims, 2 Drawing Sheets

VIBRATING MOTOR

FIELD OF THE DISCLOSURE

The present disclosure generally relates to vibrating motor technologies, and more particularly, to a vibrating motor for providing vibration feedback.

BACKGROUND

Portable consumer products, such as mobile phones, handheld game players, navigation devices and portable multi-media players, generally include vibrating motors for generating vibration feedback. For example, the vibrating motor may be used in a mobile phone for providing vibrating system feedback while receiving an incoming call, or used in a portable multi-media player for providing haptic feedback.

A typical vibrating motor includes a shell and a vibrating module received in the shell, however, an assembly between the vibrating module and the shell is somewhat complicated and therefore may reduce assembly efficiency and assembly accuracy of the vibrating motor. Furthermore, performance of the vibrating motor may also be impacted.

Therefore, it is desired to provide a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
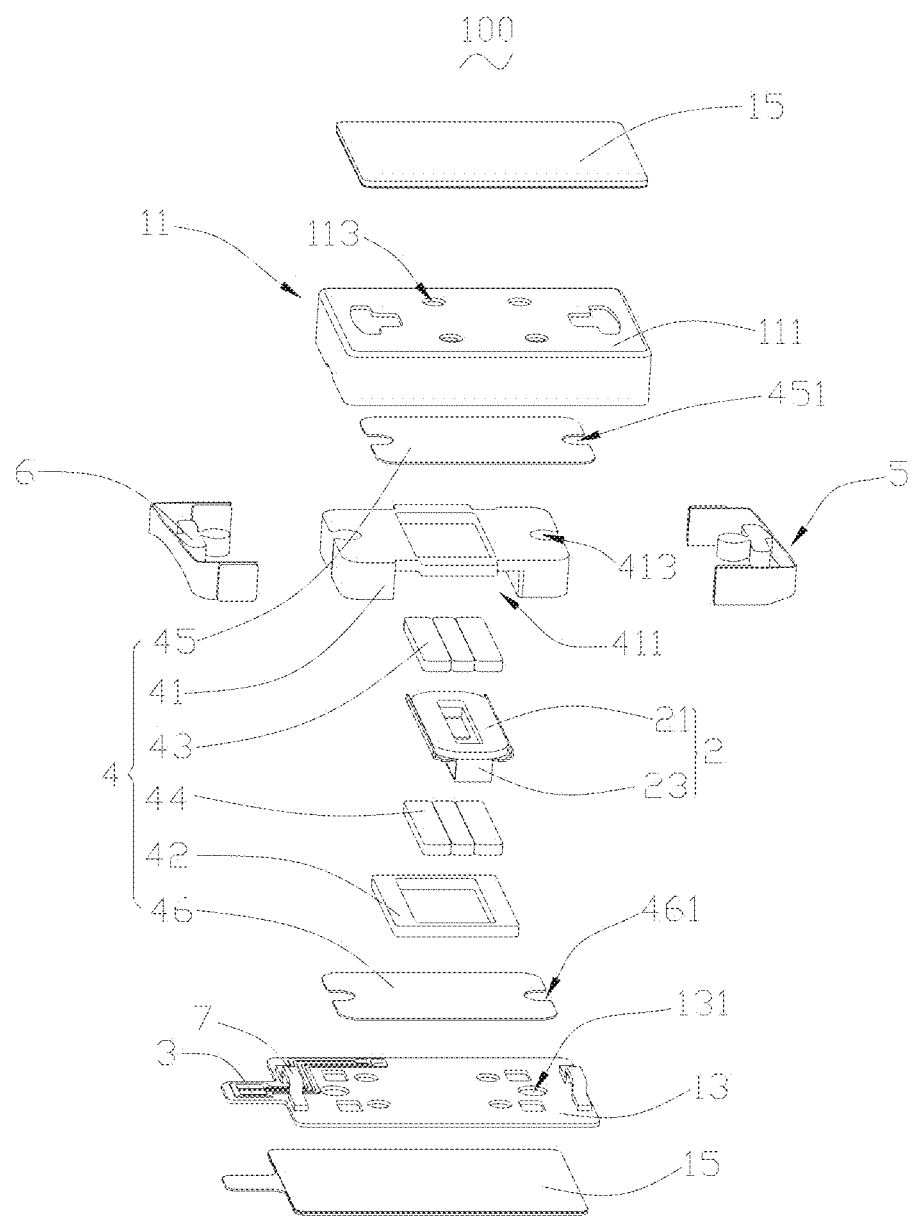
FIG. 1 is an exploded view of a vibrating motor according to an exemplary embodiment of the present disclosure.
Figure 2:
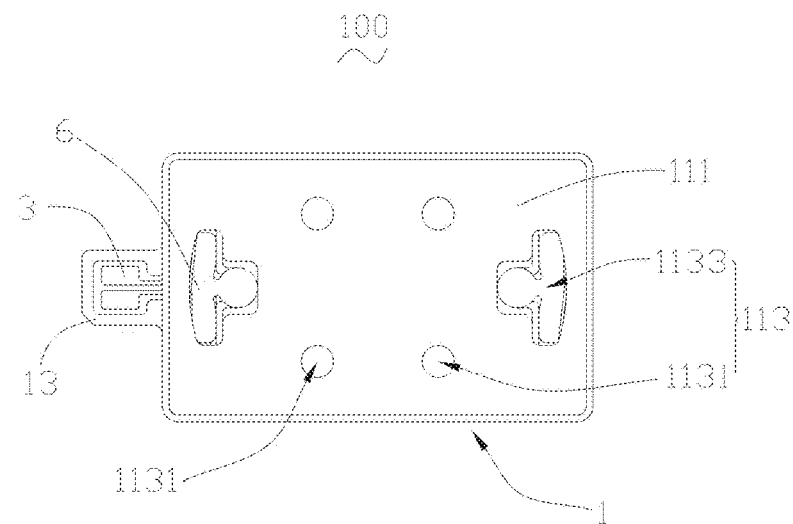
FIG. 2 is a partial, planar view of the vibrating motor in FIG. 1.

Referring to FIGS. 1-2, a vibrating motor 100 according to an exemplary embodiment of the present disclosure is shown. The vibrating motor 100 includes a fixed unit and a vibrating unit.

The fixed unit includes a shell 1 for providing a receiving cavity, a coil assembly 2 received in the receiving cavity, and a printed circuit board (PCB) 3 partly received in the shell 1. The coil assembly 2 is electrically connected to an external circuit through the PCB 3 for receiving an electric signal, and is configured for driving the vibrating unit of the vibrating motor 100 to vibrate.

The shell 1 includes a cover 11, a main plate 13 and a pair of seal plates 15. The cover 11 covers the main plate 13 cover 11 to form the receiving cavity. The pair of seal plates 15 is respectively fixed to outer surfaces of the cover 11 and the main plate 13.

The cover 11 includes a bottom plate 111 opposite to the main plate 13; and the bottom plate 111 includes a pair of first opening portions 113 formed symmetrically about a central line of the bottom plate 111. The main plate 13 includes a pair of second opening portions 131 formed symmetrically about the main plate 13. The pair of seal plates 15 is adhered to the bottom plate 111 and the main plate 13 respectively, for example, by double-sided tapes, so as to cover the first opening portions 113 and the second opening portions 131.

The coil assembly 2 includes a coil 21 and a coil support 23 for supporting the coil 21. In the present embodiment, the coil 21 includes a lead wire fixed onto the PCB 3 by spot welding; and the coil support 23 is further welded onto the main plate 13.

The PCB 3 is positioned on an inner surface of the main plate 13, and electrically connected the coil 21 via the lead wire 211, to transmit the electric signal to the coil 21.

The vibrating unit is received in the receiving cavity of the shell 1, and includes a magnetic assembly 4. The magnetic assembly 4 may be driven to vibrate in the receiving cavity by the coil assembly 2, and includes a first mass member 41 received in the shell 1, a second mass member 42 fixed to the first mass member 42, a first magnet member 43 received in the first mass member 41, a second magnet member 44 received in the second mass member 42, a first pole plate 45 fixed to an outer surface of the first mass member 41 adjacent to the bottom plate 111, and a second pole plate 46 fixed to an surface of the second mass member 42 adjacent to the main plate 13.

In the present embodiment, the first mass member 41 includes a receiving groove 411 formed at a central bottom of a main body thereof, and the second mass member 42 is received in the receiving groove 411. Preferably, the second mass member 42 is fixed to first mass member 41 via spot welding.

Additionally, the first mass member 41 further includes a pair of positioning grooves 413 respectively formed on two opposite ends thereof. The first pole plate 45 includes a pair of first positioning openings 451 respectively formed on opposite ends thereof, and the second pole plate 46 includes a pair of second positioning openings 461 respectively corresponding to the first positioning openings 451. Furthermore, the pair of first positioning openings 451 and the pair of second positioning openings 461 are respectively aligned with the pair of positioning grooves 413.

In the present embodiment, the vibrating motor 100 further includes a pair of elastic members 5 for suspending the magnetic assembly 4 in the receiving cavity, a pair of damping members 6 for restricting a relative motion between the magnetic assembly 4 and the elastic members 5, and a pair of blocking members 7 for protecting the elastic member 5 from colliding with the shell 1.

An end of each elastic member 5 is connected to the a corresponding end of first mass member 41, and the other end of each elastic member 5 is connected to the shell 1; the damping members 6 are respectively positioned between the first mass member 41 and the elastic members 5 and partly embedded into the positioning grooves 413 of the first mass member 41; the blocking members 7 are respectively positioned between the shell 1 and the elastic members 5.

As illustrated in FIG. 2, the magnetic assembly 4 may be assembled via the first opening portions 113 of the cover 11 and the second opening portions 131 of the main plate 13; each of the first opening portions 113 includes a pair of first supporting holes 1131 and a filling hole 1133. Each of the first supporting holes 1131 corresponds to the first mass member 41, and used for supporting the first mass member 41 during an assembly of the vibrating motor 100. The filling hole 1133 is arranged corresponding to one of the positioning grooves 413 of the first mass member 41, and configured for embedding the damping members 6 into spaces between the first mass member 41 and the elastic members 5. Additionally, a shape and a size of the filling holes 1133 are respectively adaptive to the damping members 6 for embedding the damping members 6 more convenient.

Figure 3:
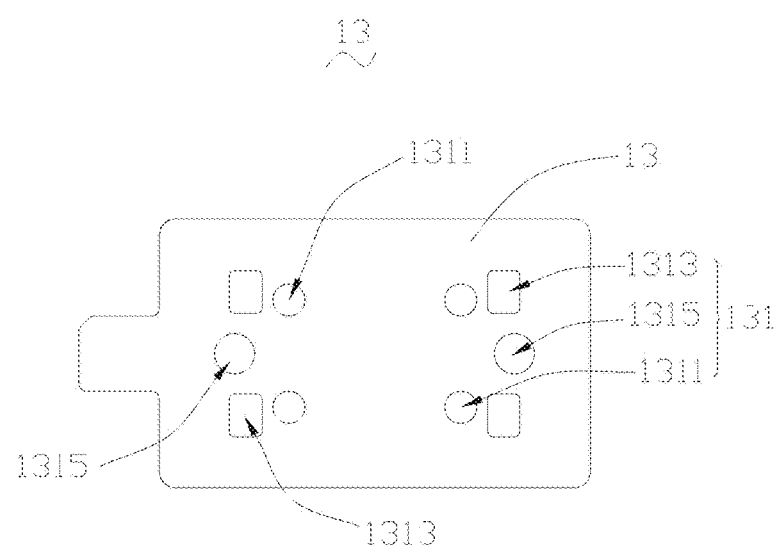
FIG. 3 is a planar view of a cover of the vibrating motor in FIG. 1.

Referring to FIG. 3, each of the second opening portions 131 includes a pair of second supporting holes 1311, a pair of welding holes 1313 and a positioning hole 1315. Each of the second supporting holes 1311 corresponds to the second mass member 42, and configured for supporting the second mass member 42 during the assembly of the vibrating motor 100. The welding holes 1313 are arranged corresponding to welding positions between the first mass member 41 and the second mass member 42, and configured for welding the first mass member 41 to the second mass member 42. The positioning hole 1315 is aligned with a corresponding one of the positioning grooves 413 of the first mass member 41, and configured for positioning the first mass member 41, as well as the first pole plate 45 and the second pole plate 46.

During the assembly of the vibrating motor 100, the magnetic assembly 4 is assembled through both the first opening portions 113 of the bottom plate 111 and the second opening portions 131 of the main plate 13, and assembly of the magnetic assembly 4 as provided in the present embodiment is described below.

In a spot welding process of the magnetic assembly 4, the first mass member 41 is welded to the second mass member 42 by a welding head, for example, the welding head may provide welding material through the welding holes 1313 of the main plate 13, and the second mass member 42 is fixed to the first mass member 41 via the welding material.

During the spot welding process, a holding device may be provided to temporarily fix the magnetic module, for example, supporting parts of the holding device may extend through the first supporting holes 1131 of the bottom plate 111 and the second supporting holes 1311 of the main plate 13, and abut and support the first mass member 41 and the second mass member 42 are respectively.

Moreover, during the assembly of the magnetic module 4, the positioning holes 1315 of the main plate 13 are respectively aligned with the positioning grooves 413 of the first mass member 41, the positioning openings 451 of the first pole plate 45 and the second positioning openings 461 of the second pole plate 46, and thus the first mass member 41, the first pole plate 45 and the second pole plate 46 can be positioned conveniently and accurately.

Furthermore, the filling holes 1133 of the cover 11 are aligned with the positioning grooves 413 of the first mass member 41, and the damping members 6 are embedded into the spaces between the first mass member 41 and the elastic members 5 and partly received in the positioning grooves 413 via the filing holes 1133 of the cover 11. As such, in the present embodiment, performance of the vibrating motor 100 can be adjusted by the damping members 6 even if the vibrating motor 100 is assembled.

Alternatively, in another embodiment, roles of the coil assembly 2 and the magnetic assembly 4 can be reversed. For example, the coil assembly 2 can be a part of the vibrating unit, while the magnetic assembly 4 can be a part of the fixed unit.

In the vibrating motor 100 as provided in present disclosure, the first opening portions 113 and the second opening portions 131 are respectively formed in the cover 11 and the main plate 13 for facilitating the assembly of the magnetic assembly 4; and the damping members 6 is embedded into spaces between the first mass member 41 and the elastic members 5 through the filling holes 1133. With this configuration, the vibrating unit may be assembled conveniently and efficiently, and thereby improving assembly accuracy and performance of the vibrating motor 100.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibrating motor, comprising:
a shell comprising a main plate and a cover covering the main plate for providing a receiving cavity;
a vibrating unit including a magnetic assembly received in the receiving cavity;
a pair of elastic members suspending the vibrating unit;
a coil assembly for driving the magnetic assembly to vibrate;
wherein the cover comprises a bottom plate opposite to the main plate; the bottom plate comprises a pair of first opening portions, and the main plate comprises a pair of second opening portions, the first opening portions and the second opening portions are arranged corresponding to each other for assembling the magnetic assembly; the magnetic assembly comprises a pair of positioning grooves, the positioning grooves are aligned with a portion of the first opening portions and a portion of the second opening portions.

2. The vibrating motor as described in claim 1, wherein the magnetic assembly comprises a first mass member and a second mass member fixed to the first mass member, the pair of positioning grooves are formed on two opposite ends of the first mass member.

3. The vibrating motor as described in claim 2, wherein each of the first opening portions comprises a pair of first supporting holes corresponding to the first mass member, and a filling hole corresponding to one of the positioning grooves of the first mass member.

4. The vibrating motor as described in claim 3, wherein each of the second opening portions comprises a pair of second supporting holes corresponding to the second mass member, a pair of welding holes corresponding to welding positions between the first mass member and the second mass member, and a positioning hole aligned with a corresponding one of the positioning grooves of the first mass member.

5. The vibrating motor as described in claim 3, further comprising a pair of damping members, wherein the damping members are embedded into spaces between the elastic members and the first mass member and partly received in the positioning grooves via the filling holes of the bottom plate.

6. The vibrating motor as described in claim 5, wherein a shape and a size of the filling holes are respectively adaptive to the damping members.

7. The vibrating motor as described in claim 2, wherein the first mass member comprises a receiving groove formed at a central bottom of a main body thereof, and the second mass member is received in the receiving groove of first mass member.

8. The vibrating motor as described in claim 2, wherein the magnetic assembly further comprises a first pole plate and a second pole plate respectively fixed to the first mass member and the second mass member, the first pole plate comprises a pair of first positioning opening formed at two opposite ends thereof, and the second pole plate comprises a pair of second positioning opening corresponding to the first positioning openings respectively.

9. The vibrating motor as described in claim 8, wherein both the pair of first positioning openings and the pair of second positioning openings are aligned with the pair of positioning grooves.

10. The vibrating motor as described in claim 2, wherein the magnetic assembly further comprises a first magnet member received in the first mass member, and a second magnet member received in the second mass member.

11. The vibrating motor as described in claim 1, wherein, an end of each of the elastic members is connected to the first mass member, and the other end of each of the elastic members is connected to the shell.

12. The vibrating motor as described in claim 1, wherein the shell further comprises a pair of seal plates respectively fixed to the bottom plate and the main plate.

13. The vibrating motor as described in claim 1, wherein the coil assembly comprises a coil and a coil support supporting the coil.

14. The vibrating motor as described in claim 1, further comprising a pair of blocking members, wherein the blocking members are respectively positioned between the shell and the elastic members.

* * * * *